E. M. CALDWELL.
NURSING NIPPLE.
APPLICATION FILED FEB. 19, 1917.

1,270,693. Patented June 25, 1918.

Inventor
Edwin M Caldwell
By Joseph A Miller
Attorney

UNITED STATES PATENT OFFICE.

EDWIN M. CALDWELL, OF EDGEWOOD, RHODE ISLAND, ASSIGNOR TO DAVOL RUBBER COMPANY, OF PROVIDENCE, RHODE ISLAND, A CORPORATION OF RHODE ISLAND.

NURSING-NIPPLE.

1,270,693.    Specification of Letters Patent.    Patented June 25, 1918.

Application filed February 19, 1917. Serial No. 149,424.

*To all whom it may concern:*

Be it known that I, EDWIN M. CALDWELL, a citizen of the United States, residing at Edgewood, in the county of Providence and State of Rhode Island, have invented a new and useful Improvement in Nursing-Nipples, of which the following is a specification.

This invention relates to certain new and useful improvements in nursing nipples, and the primary object of the invention is to provide a nursing nipple in which the liquid food, such as milk, will be caused to egress from the nipple radially thereof, as distinguished from longitudinal egress.

The milk by reason of being radially ejected from the nipple will be deflected to the sides of the mouth rather than in a line leading directly into the throat, with the advantage that the milk is afforded better opportunity to mix with the saliva than in cases where it passes directly to the throat.

In the drawings—

Figure 1:
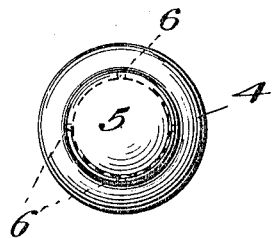
Figure 1 is a top plan view of a nipple constructed in accordance with the invention.
Figure 3:
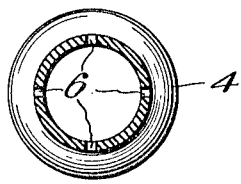
Fig. 3 is a section on the line 3—3 of Fig. 2.
Figure 2:
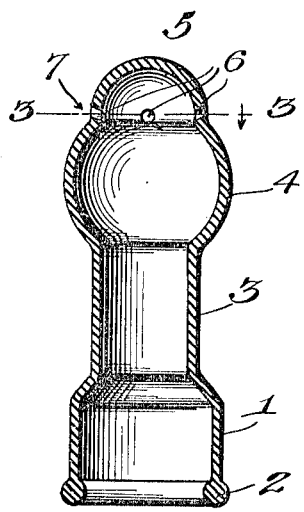
Fig. 2 is a central vertical sectional view.
Figure 4:
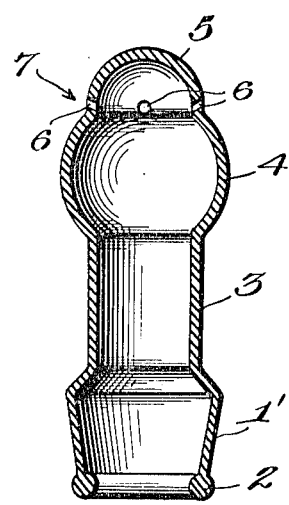
Fig. 4 is a view similar to Fig. 2, of a modified form of the invention.

The base of the nipple designated 1 may be of any preferred form, such as shown in Fig. 1, with a straight skirt, or as shown in Fig. 4 with a skirt contracted at its lower or base end as depicted at 1', a bead 2 being formed on the extremity of the base end to increase the anchoring effect of the nipple on the bottle, as will be apparent and understood.

The neck of the nipple is designated 3 and is surmounted by a head or mouth piece 4, which latter in turn is surmounted by a semi-spherical dome 5. The dome 5, is of less diameter than that of the head 4, and consequently provides an annular contracted part or groove 7 between the dome and head. This groove is alined with the radial liquid discharge apertures 6, which latter are formed at the points of juncture of the head and dome as depicted in the drawings.

Further, the milk is not caused to egress in a small space, such as in cases where the top of the nipple is perforated, but is discharged throughout the circumference of the nipple and thus afforded greater opportunity to mix with the saliva as distinguished from cases in which the nipple is perforated so that the milk is discharged in practically a single stream.

The discharge of the milk is practically at direct right angles to the longitudinal axis of the nipple so that the milk passes to the sides of the mouth in a positive and certain manner, and since the discharge apertures are located throughout the circumference of the nipple, one or more of such apertures will be always uncovered to allow air to freely enter and thus prevent collapse of the nipple.

The dome acts to prevent collapse of the nipple since it serves to keep a space between the mouth and the discharge passages or apertures 6.

By having the perforations 6, at an angle, and in the contracted part 7, the tongue of the child cannot close same due to the upwardly projecting dome 5. While pressure by the gums on the part 4 will partly interfere with the suction through the holes 6, still such suction will not be wholly destroyed.

Having thus described my invention, what I claim as new and desire to secure by Letters Patent is—

1. A nipple composed of a base, a neck, a head and a dome surmounting the head, the dome being of less diameter than the head to form an annular contracted part in connection therewith, the nipple being formed with a series of discharge passages disposed throughout its circumference and radially thereof and located at the points of juncture between the head and dome.

2. A nipple composed of a base, a neck, and a head having a contracted part with radial discharge apertures in the contracted part.

3. A nipple having a head formed with radial discharge passages at the top of the head, and a guard-like member for the discharge passages carried by the head and extending upwardly from the top of the head.

4. A nipple having a closed end and formed with a substantially annular groove below said end, and having a series of discharge passages extending radially of the nipple and through said groove.

5. A nipple formed with a head and a dome smaller than the head and having radial discharge passages at the juncture of the head and dome.

In testimony whereof I have signed my name to this specification in the presence of two subscribing witnesses.

EDWIN M. CALDWELL.

Witnesses:
ADA E. HAGERTY,
J. A. MILLER.